(12) United States Patent
Lyall

(10) Patent No.: US 12,404,968 B1
(45) Date of Patent: Sep. 2, 2025

(54) MOUNTING BRACKET FOR USE IN BUILDING ON A TREE

(71) Applicant: Jacob Lyall, Chapmanville, WV (US)

(72) Inventor: Jacob Lyall, Chapmanville, WV (US)

(*) Notice: Subject to any disclaimer, the term of this patent is extended or adjusted under 35 U.S.C. 154(b) by 8 days.

(21) Appl. No.: 18/426,600

(22) Filed: Jan. 30, 2024

(51) Int. Cl.
*F16M 13/02* (2006.01)

(52) U.S. Cl.
CPC .................................... *F16M 13/02* (2013.01)

(58) Field of Classification Search
CPC ........ F16M 13/02; E04B 1/3404; E04H 15/04
See application file for complete search history.

(56) References Cited

U.S. PATENT DOCUMENTS

| | | | | |
|---|---|---|---|---|
| 1,759,966 | A * | 5/1930 | Swinney | A01D 46/20 182/187 |
| 4,056,902 | A * | 11/1977 | Ziegler, Jr. | E04H 15/04 52/73 |
| 4,924,972 | A | 5/1990 | Westbrock | |
| 5,458,215 | A | 10/1995 | Burgin | |
| 5,522,186 | A * | 6/1996 | Jarman | E04H 15/04 182/187 |
| 5,853,066 | A * | 12/1998 | Gohn | A01M 31/02 182/20 |
| 6,205,935 | B1 | 3/2001 | Lindaman | |
| 6,668,977 | B2 * | 12/2003 | Arsenault | A01M 31/02 182/187 |
| 6,725,972 | B1 * | 4/2004 | Krier | A01M 31/02 182/187 |
| D612,516 | S * | 3/2010 | Stainton | D25/33 |
| 8,272,479 | B1 * | 9/2012 | Leach | A01M 31/02 182/187 |
| 8,657,071 | B2 * | 2/2014 | Curry | A01M 31/02 248/219.3 |
| 8,752,670 | B2 | 6/2014 | Holman | |
| 8,973,708 | B1 * | 3/2015 | Fenner | A01M 31/02 182/12 |
| 9,038,347 | B2 * | 5/2015 | Gundersen | E04C 3/292 52/636 |
| 9,162,854 | B1 | 10/2015 | Ridgeway | |
| 9,743,774 | B1 * | 8/2017 | Hauser | A47C 9/10 |
| 9,832,989 | B2 * | 12/2017 | Hillis | E06C 1/10 |
| 9,896,834 | B1 * | 2/2018 | Hyams | E04B 1/24 |
| 10,398,139 | B2 * | 9/2019 | Wynalda, Jr. | A01M 31/025 |
| 10,474,013 | B2 * | 11/2019 | Wynalda, Jr. | F16M 13/022 |

(Continued)

FOREIGN PATENT DOCUMENTS

WO          2019165276          8/2019

*Primary Examiner* — Eret C McNichols
(74) *Attorney, Agent, or Firm* — Kyle A. Fletcher, Esq.

(57) ABSTRACT

The mounted bracket for use in building on a tree is a mechanical structure. The mounted bracket for use in building on a tree is a load bearing structure. Each mounted bracket for use in building on a tree is a bracket. One or more instantiations of the mounted bracket for use in building on a tree attaches a platform structure to a load bearing anchor structure. The one or more instantiations of the mounted bracket for use in building on a tree elevate the platform structure above the ground. Each mounted bracket for use in building on a tree includes a platform plate, a mounting nut, a guard plate, and a fastening device. The mounting nut and the guard plate attach to the platform plate. The fastening device secures the mounted bracket for use in building on a tree to the load bearing anchor structure.

13 Claims, 7 Drawing Sheets

(56) References Cited

U.S. PATENT DOCUMENTS

| | | | |
|---|---|---|---|
| 10,928,151 B2 | 2/2021 | Isch | |
| 11,284,614 B1* | 3/2022 | Hauser | A01M 31/02 |
| 11,299,933 B2* | 4/2022 | Petreman | E06C 1/34 |
| D970,337 S | 11/2022 | Smith | |
| 11,806,582 B1* | 11/2023 | Brown | A01M 31/02 |
| 11,883,719 B2* | 1/2024 | Power, II | A63B 27/00 |
| 12,063,926 B2* | 8/2024 | Wynalda, Jr. | A01M 31/02 |
| 12,146,612 B2* | 11/2024 | Wynalda, Jr. | E06C 1/34 |
| 2003/0209388 A1* | 11/2003 | Arsenault | A01M 31/02 |
| | | | 182/187 |
| 2007/0130875 A1* | 6/2007 | Detal | A63H 33/008 |
| | | | 52/650.3 |
| 2009/0277721 A1* | 11/2009 | Weir | A01M 31/02 |
| | | | 182/115 |
| 2010/0314514 A1* | 12/2010 | Nelson | F16M 11/2021 |
| | | | 248/218.4 |
| 2016/0044911 A1 | 2/2016 | Bayus | |
| 2021/0356075 A1* | 11/2021 | Komenda | F16B 25/0057 |
| 2023/0397600 A1* | 12/2023 | Schofield | A01M 31/02 |

\* cited by examiner

MOUNTING BRACKET FOR USE IN BUILDING ON A TREE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of supports for positioning apparatus to an object such as a tree. (F16M13/02)

SUMMARY OF INVENTION

The mounted bracket for use in building on a tree is a mechanical structure. The mounted bracket for use in building on a tree is a load bearing structure. Each mounted bracket for use in building on a tree is a bracket. One or more instantiations of the mounted bracket for use in building on a tree attaches a platform structure to a load bearing anchor structure. The one or more instantiations of the mounted bracket for use in building on a tree elevate the platform structure above the ground. Each mounted bracket for use in building on a tree comprises a platform plate, a mounting nut, a guard plate, and a fastening device. The mounting nut and the guard plate attach to the platform plate. The fastening device secures the mounted bracket for use in building on a tree to the load bearing anchor structure.

These together with additional objects, features and advantages of the mounted bracket for use in building on a tree will be readily apparent to those of ordinary skill in the art upon reading the following detailed description of the presently preferred, but nonetheless illustrative, embodiments when taken in conjunction with the accompanying drawings.

In this respect, before explaining the current embodiments of the mounted bracket for use in building on a tree in detail, it is to be understood that the mounted bracket for use in building on a tree is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the mounted bracket for use in building on a tree.

It is therefore important that the claims be regarded as including such equivalent construction insofar as they do not depart from the spirit and scope of the mounted bracket for use in building on a tree. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
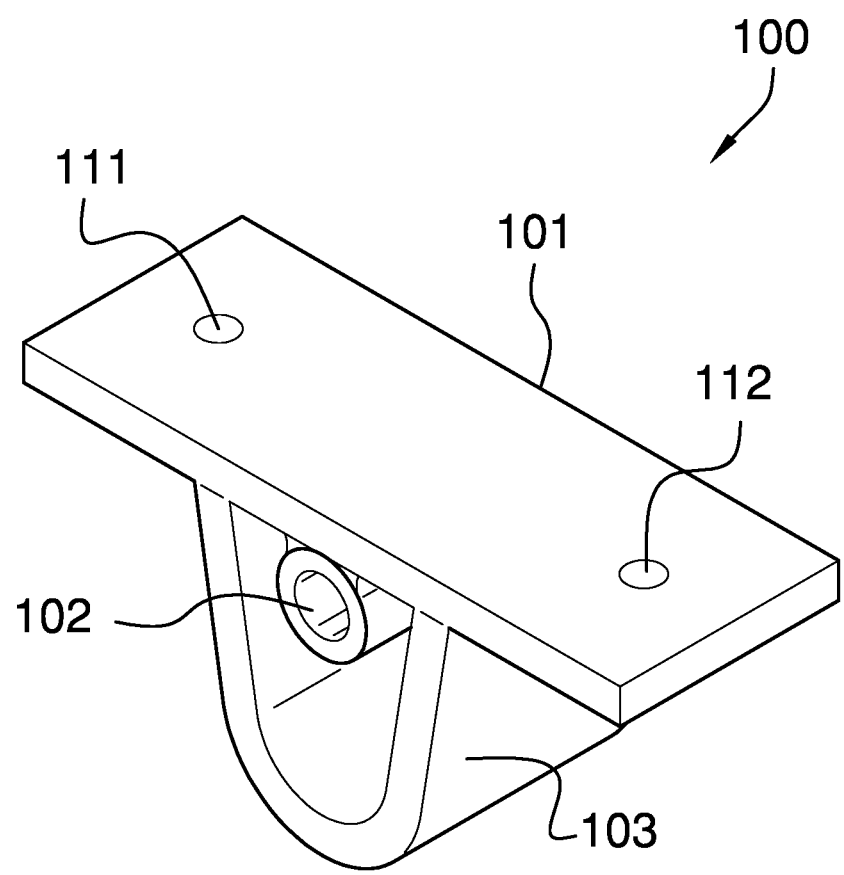
FIG. 1 is a perspective view of an embodiment of the disclosure.
Figure 2:
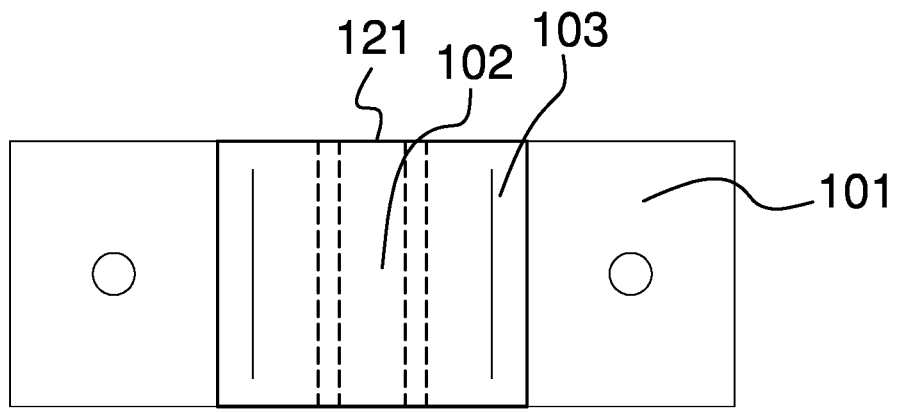
FIG. 2 is a bottom view of an embodiment of the disclosure.
Figure 3:
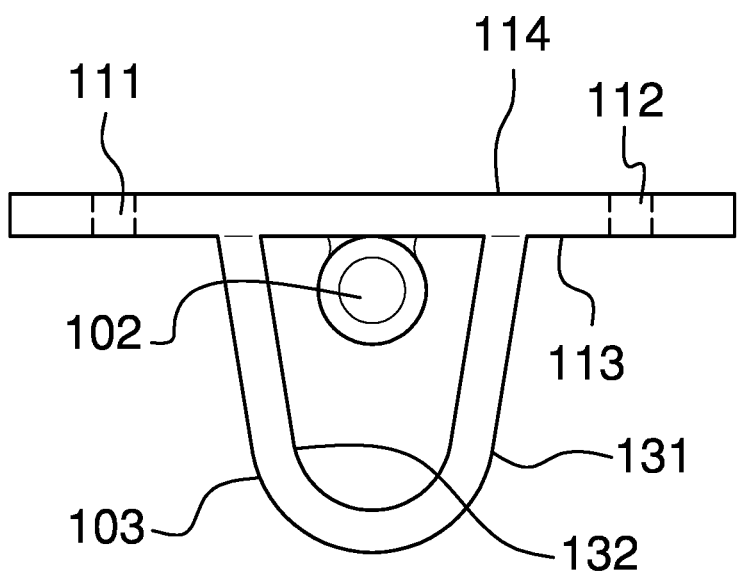
FIG. 3 is a front view of an embodiment of the disclosure.
Figure 4:
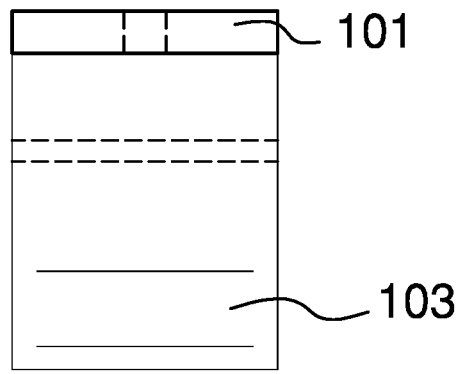
FIG. 4 is a side view of an embodiment of the disclosure.
Figure 5:
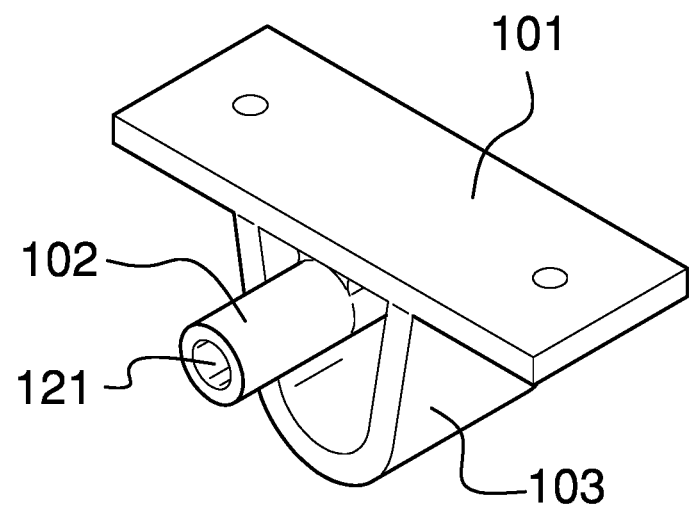
FIG. 5 is a perspective view of an alternate embodiment of the disclosure.
Figure 6:
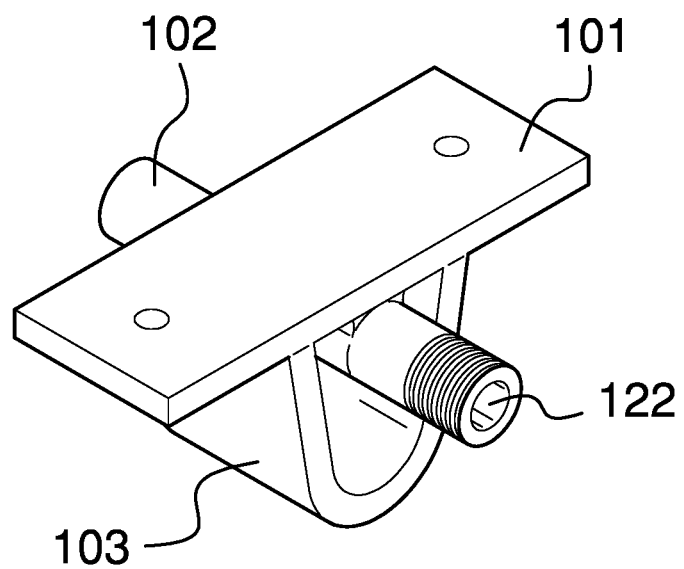
FIG. 6 is a perspective view of an alternate embodiment of the disclosure.
Figure 7:
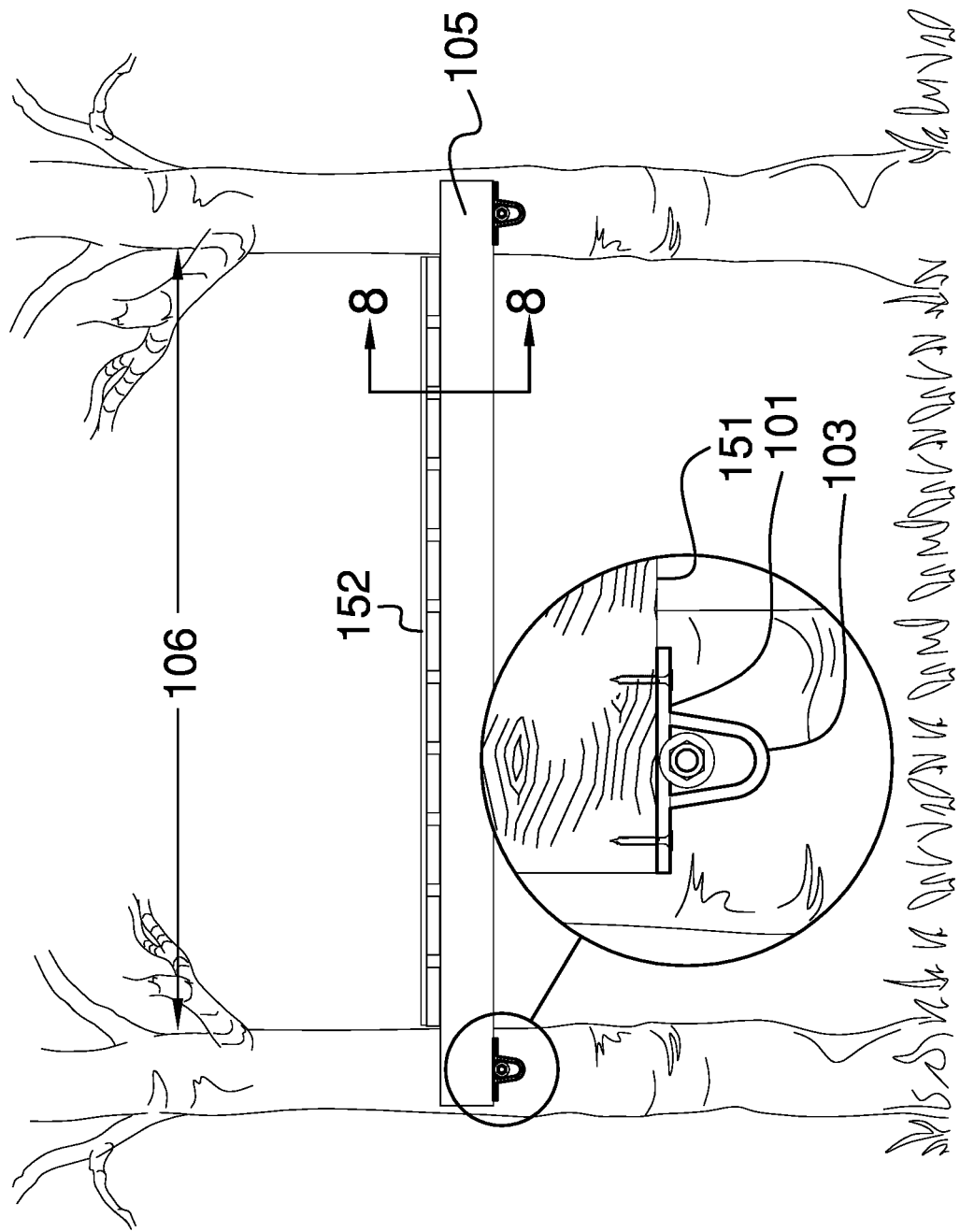
FIG. 7 is an in-use view of an embodiment of the disclosure.
Figure 8:
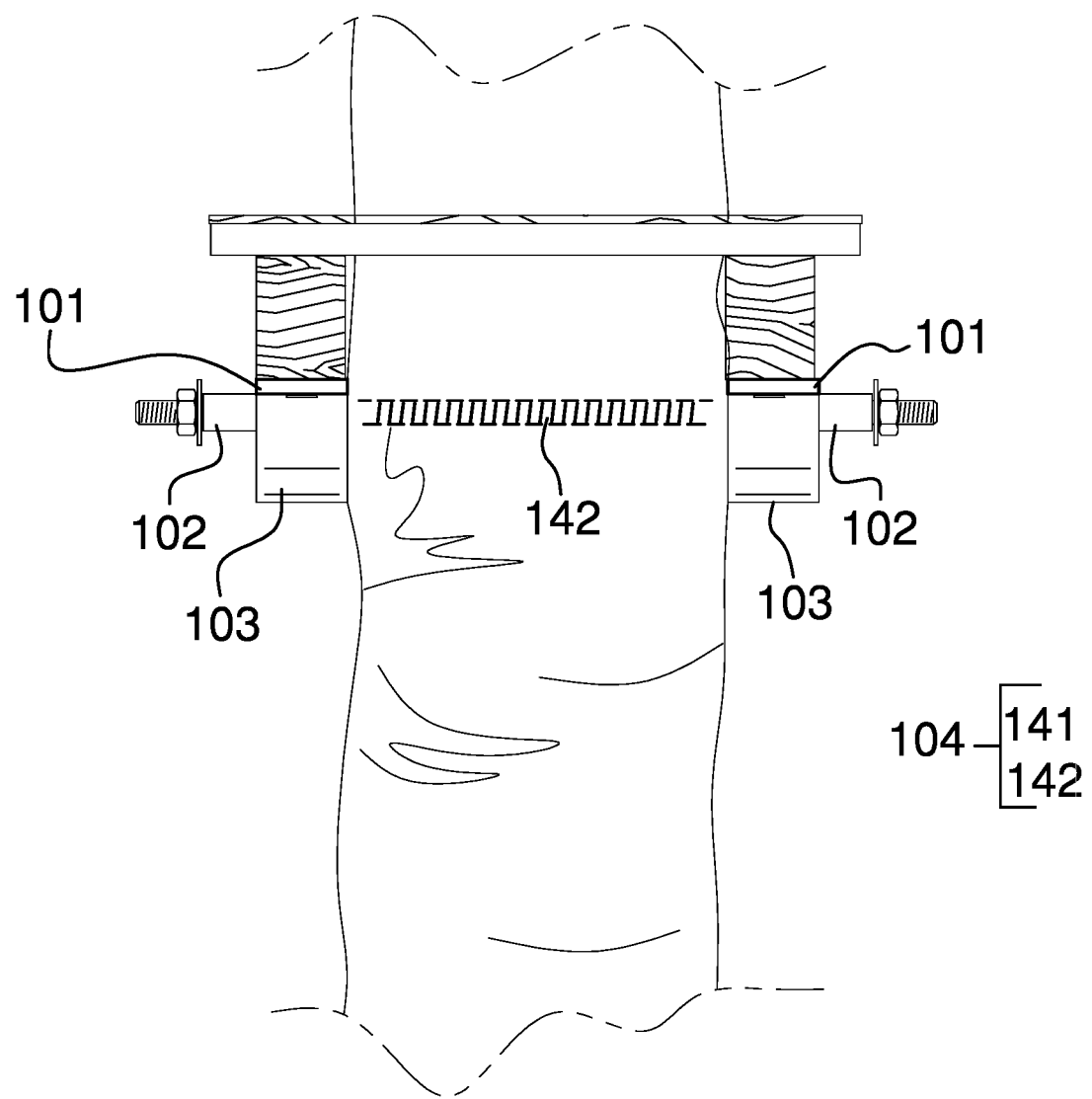
FIG. 8 is an in-use view of an embodiment of the disclosure.
Figure 9:
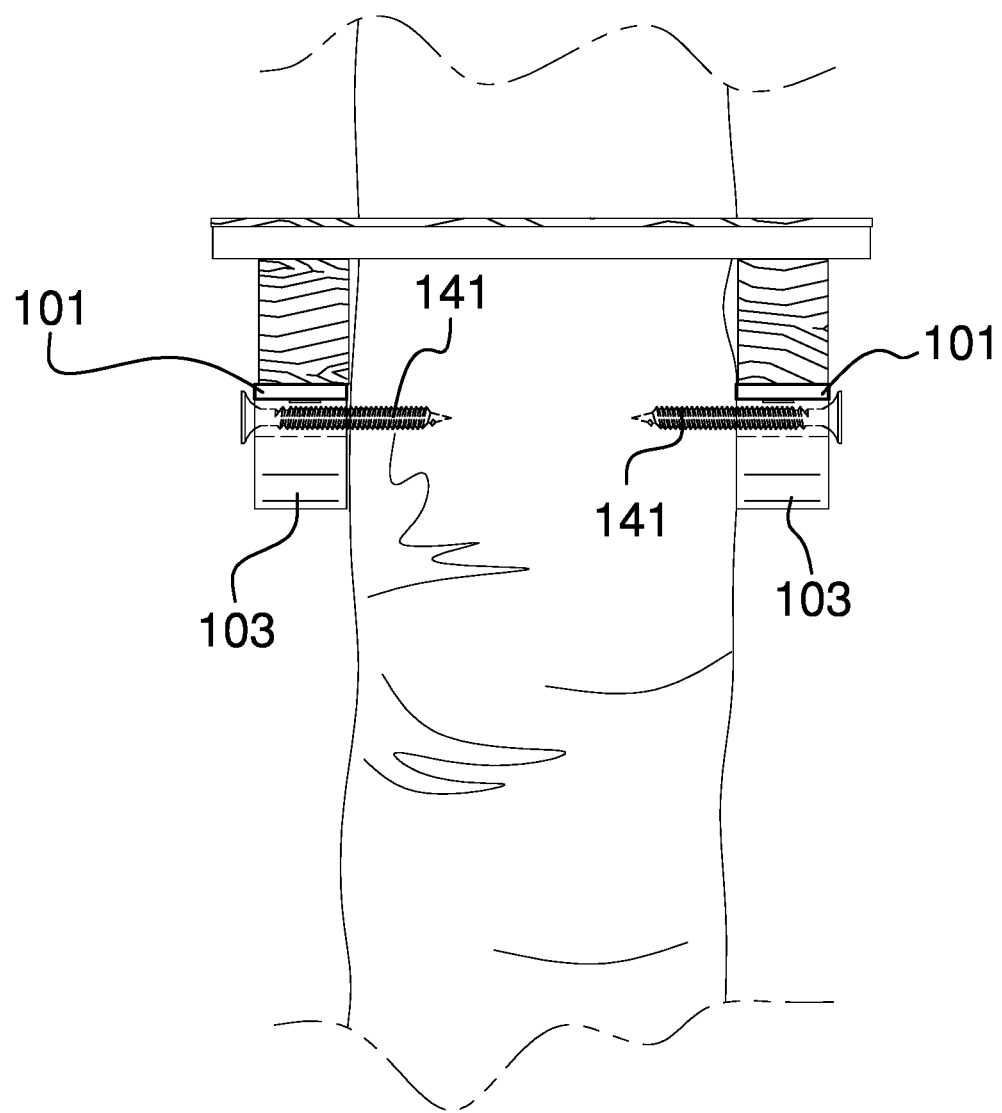
FIG. 9 is an in-use view of an embodiment of the disclosure.

Detailed reference will now be made to one or more potential embodiments of the disclosure, which are illustrated in FIGS. 1 through 9.

The mounted bracket for use in building on a tree (hereinafter invention) is a mechanical structure. The invention 100 is a load bearing structure. Each invention is a bracket. One or more instantiations of the invention attaches a platform structure 105 to a load bearing anchor structure 106. The one or more instantiations of the invention 100 elevate the platform structure 105 above the ground. Each invention 100 comprises a platform plate 101, a mounting nut 102, a guard plate 103, and a fastening device 104. The mounting nut 102 and the guard plate 103 attach to the platform plate 101. The fastening device 104 secures the invention to the load bearing anchor structure 106.

The load bearing anchor structure 106 is a load bearing structure. The load bearing anchor structure 106 is a roughly prism shaped structure. The load bearing anchor structure forms the structure that transfers the load of the invention to the ground.

The platform structure 105 is a disk shaped structure. The platform structure 105 is a Euclidean structure. The platform structure 105 is a horizontally oriented structure. The platform structure 105 attaches to the platform plate 101. The platform plate 101 elevates the platform structure 105 above the ground. The platform structure 105 comprises an inferior platform face 151 and a superior platform face 152.

The superior platform face 152 is the congruent end of the disk structure of the platform structure 105 with the greatest surface area. The superior platform face 152 is the congruent end of platform structure 105 that is distal from the ground. The inferior platform face 151 is the congruent end of the disk structure of the platform structure 105 that is distal from the superior platform face 152. The inferior platform face 151 is the congruent end of platform structure 105 that is proximal to the ground.

The platform plate 101 is a disk shaped structure. The platform plate 101 is a Euclidean structure. The platform plate is a rigid structure. The platform plate 101 is a load bearing structure. The platform plate 101 forms the structure of the that attaches the invention 100 to the inferior platform face 151 of the platform structure 105. The platform plate receives the load of the platform structure 105. The platform plate 101 transfers the load of the platform structure 105 to the mounting nut 102. The platform plate 101 comprises a first mounting nut 111, a second mounting nut 112, an inferior plate face 113, and a superior plate face 114.

The first mounting nut 111 is a clean nut. The first mounting nut 111 forms a prism shaped negative space that passes through the inferior plate face 113 and the superior plate face 114 of the platform plate 101. The first mounting nut 111 forms a nut that allows a screw to screw directly into the inferior platform face 151 of the platform structure 105.

The second mounting nut 112 is a clean nut. The second mounting nut 112 forms a prism shaped negative space that passes through the inferior plate face 113 and the superior plate face 114 of the platform plate 101. The second mounting nut forms a nut that allows a screw to screw directly into the inferior platform face 151 of the platform structure 105.

The superior plate face 114 is the congruent end of the disk structure of the platform plate 101 with the greatest surface area. The superior plate face 114 is the face of the platform plate 101 that is placed against the inferior platform face 151 of the fastening device 104.

The inferior plate face 113 is the congruent end of the disk structure of the platform plate 101 that is distal from the superior plate face 114. The inferior plate face 113 is the face of the platform plate 101 that is distal from the inferior platform face 151. The mounting nut 102 attaches to the inferior plate face 113. The guard plate 103 attaches to the inferior plate face 113.

The mounting nut 102 is a prism shaped structure. The mounting nut 102 is a hollow structure. The mounting nut has a tubular shape. The lateral face of the prism structure of the mounting nut 102 permanently attaches to the inferior plate face 113 of the platform plate 101. The mounting nut receives the load of the platform plate 101. The mounting nut 102 transfers a portion of the load borne by the platform plate 101 directly to the load bearing anchor structure 106. The mounting nut 102 transfers the balance of the load borne by the platform plate 101 to the fastening device 104. The fastening device 104 inserts through the mounting nut 102 to secure the invention 100 to the load bearing anchor structure 106. The mounting nut 102 comprises a first open end 121 and a second open end 122.

The first open end 121 is an open congruent end of the tubular structure of the mounting nut 102. The first open end 121 is the congruent end of the mounting nut 102 that is distal from the load bearing anchor structure 106. The fastening device 104 inserts into the mounting nut 102 through the first open end 121.

The second open end 122 is an open congruent end of the tubular structure of the mounting nut 102. The second open end is the congruent end of the mounting nut 102 that is proximal to the load bearing anchor structure 106. The fastening device 104 exits the second open end 122 as the fastening device 104 attaches to the load bearing anchor structure 106.

The guard plate 103 is a disk shaped structure. The guard plate 103 has a non-Euclidean disk shape. The guard plate 103 attaches to the inferior plate face 113 of the platform plate 101. The guard plate 103 forms a protected space that encloses the mounting nut 102. The guard plate 103 protects the mounting nut 102 from potential environmental impacts. The guard plate 103 is a roughly u-shaped structure. The guard plate 103 comprises a convex face 131 and a concave face 132.

The concave face 132 is a concave surface that is formed in the u-shape of the guard plate 103. The concave face 132 forms the interior surface of the boundary of the protected space formed by the guard plate 103. The concave face 132 forms the surface of the guard plate 103 that is proximal to the mounting nut 102.

The convex face 131 is a concave surface that is formed in the u-shape of the guard plate 103. The convex face 131 forms the exterior surface of the boundary of the of the protected space formed by the guard plate 103. The convex face 131 forms the surface of the guard plate 103 that is distal from the mounting nut 102.

The fastening device 104 is a mechanical structure. The fastening device 104 forms the physical device that attaches the invention 100 to the load bearing anchor structure 106. The fastening device 104 is configured for use with one instantiation of the invention 100. The fastening device 104 is configurable for simultaneous use with two instantiations of the invention 100. The fastening device 104 is selected from the group consisting of anchor screw 141 and a mounting bolt 142.

The anchor screw 141 is a helical structure. The anchor screw 141 is a wood screw. The anchor screw 141 is a prism shaped structure that forms a point at the working end of the screw. The anchor screw 141 is formed with an external screw. The anchor screw 141 inserts through the mounting nut 102. The anchor screw 141 fastens the invention 100 to the load bearing anchor structure 106 by screwing into the load bearing anchor structure 106.

The mounting bolt 142 is a helical structure. The mounting bolt 142 is formed with an exterior screw. The mounting bolt inserts through a first mounting nut 102 of a first instantiation of the invention 100. The mounting bolt 142 further inserts through a second mounting nut 102 of a second instantiation of the invention 100. The mounting bolt 142 a threaded nut attaches to the two congruent ends of the mounting bolt to secure the platform structure 105 to the load bearing anchor structure 106.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Anchor: As used in this disclosure, anchor means to hold an object firmly or securely.

Barrier: As used in this disclosure, a barrier is a physical obstacle that forms a boundary between a first space and a second space. The barrier prevents the passage of an object between the first space and the second space.

Bolt: As used in this disclosure, a bolt is a cylindrical shaft that is formed with an exterior screw thread. A bolt is defined with an outer dimension.

Bolt Hole: As used in this disclosure, a bolt hole is a prism-shaped disk that is formed with a cylindrical negative space that allows a shaft to be inserted through the faces of the disk. A bolt hole is further defined with an inner diameter.

Bracket: As used in this disclosure, a bracket is a mechanical structure that attaches a second structure to a first structure such that the load of the second structure is fully transferred to the first structure.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Clean Nut: As used in this disclosure, a clean nut is a negative space that is formed through the faces of a prism-shaped disk structure. The negative space that forms the clean nut forms a disk-shaped structure that allows a shaft to be inserted through the faces of the disk. The use of the term clean nut indicates that an interior screw thread is not formed on the lateral face of the clean nut. The clean nut is further defined with an inner dimension. A clean nut is also referred to as a washer and a spacer.

Composite Prism: As used in this disclosure, a composite prism refers to a structure that is formed from a plurality of structures selected from the group consisting of a prism structure, a pyramid structure, and a spherical structure. The plurality of selected structures may or may not be truncated or bifurcated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Diameter: As used in this disclosure, a diameter of an object is a straight line segment (or a radial line) that passes through the center (or center axis) of an object. The line segment of the diameter is terminated at the perimeter or boundary of the object through which the line segment of the diameter runs. A radius refers to the line segment that overlays a diameter with one termination at the center of the object. A span of a radius is always one half the span of the diameter.

Diametrically Opposed: As used in this disclosure, diametrically opposed is a term that describes the locations of a first object and a second object located at opposite ends of a diameter drawn through a third object. The term diametric opposition can also be used to describe this relationship.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Euclidean Surface: As used in this disclosure, a Euclidean surface refers to a two-dimensional plane that is formed without a curvature. By without a curvature is meant that the shortest distance between any two points on a Euclidean surface forms a line that remains on the Euclidean surface.

Exterior: As used in this disclosure, the exterior is used as a relational term that implies that an object is not contained within the boundary of a structure or a space.

Exterior Screw Thread: An exterior screw thread is a ridge wrapped around the outer surface of a tube in the form of a helical structure that is used to convert rotational movement into linear movement.

Force: As used in this disclosure, a force refers to a net (or unopposed) measurable interaction that changes the direction of motion of an object, the velocity of motion of an object, the momentum of an object, or the stress within an object. The term work refers to a measure of the amount of energy that is transferred through the application of a force over a distance. The term power refers to a measure of the amount of energy that is transferred over a period of time.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1. By the term essentially geometrically similar is meant that the primary shapes of two objects are geometrically similar except that there are functional items (such as fastening devices) associated with the primary shape may not maintain the ratio for geometric similarity. By the term roughly geometrically similar is meant that the form factors between the primary shape of the two objects can vary by a factor of up to 10% when the two objects are normalized to be roughly geometrically identical.

Ground: As used in this disclosure, the ground is a solid supporting surface formed by the Earth. The term level ground means that the supporting surface formed by the ground is roughly perpendicular to the force of gravity. The term underground refers to an object being underneath the superior surface of the ground. Always use supporting surface.

Helix: As used in this disclosure, a helix is the three-dimensional structure that would be formed by a wire that is wound uniformly around the surface of a cylinder or a cone. If the wire is wrapped around a cylinder the helix is called a cylindrical helix. If the wire is wrapped around a cone, the helix is called a conical helix. A synonym for conical helix would be a volute.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Impact: As used in this disclosure, an impact refers to an exchange of momentum between two objects over a duration. An impact often refers to a collision between two objects.

Inferior: As used in this disclosure, the term inferior refers to a directional reference that is parallel to and in the same direction as the force of gravity when an object is positioned or used normally.

Instantiation: As used in this disclosure, an instantiation refers to a specific physical object or process that is created using a specification.

Interior: As used in this disclosure, the interior is used as a relational term that implies that an object is contained within the boundary of a structure or a space.

Interior Screw Thread: An interior screw thread is a groove that is formed around the inner surface of a tube in the form of a helical structure that is used to convert rotational movement into linear movement.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Momentum: As used in this disclosure, momentum is a measured quantity associated with the mass of a moving object. The momentum of the object equals the mass of the object multiplied by the velocity of the object. The exchange of momentum between two objects is a conserved quantity meaning that the sum of the momentums of the two objects before an exchange of momentum equals the sum of the momentums of the two objects after the exchange.

Mount: As used in this disclosure, a mount is a mechanical structure that attaches or incorporates an object into a load path.

Negative Space: As used in this disclosure, negative space is a method of defining an object through the use of open or empty space as the definition of the object itself, or, through the use of open or empty space to describe the boundaries of an object.

Non-Euclidean Disk: As used in this disclosure, a non-Euclidean structure is a disk-shaped structure wherein the congruent end (faces) of the disk structure lies on a non-Euclidean plane.

Non-Euclidean Plane: As used in this disclosure, a non-Euclidean plane (or non-Euclidean surface) is a geometric plane that is formed with a curvature such that: a) two parallel lines will intersect somewhere in the planar surface; or, b) the span of the perpendicular distance between two parallel lines will vary as a function of the position of the plane; or, c) the minimum distance between two points on the non-Euclidean plane as measured along the non-Euclidean plane is greater than the absolute minimum distance between the same two points. In many geometries, the statements (a) and (b) can be considered identical statements. A non-Euclidean plane is said to form a roughly Euclidean surface (or plane) when the span of the minimum distance between two points on the non-Euclidean plane as measured along the non-Euclidean plane is less than or equal to 1.1 times the absolute minimum distance between the same two points.

Non-Euclidean Prism: As used in this disclosure, a non-Euclidean prism is a prism structure wherein the center axis of the prism lies on a non-Euclidean plane or is otherwise formed with a curvature.

Non-Euclidean Structure: As used in this disclosure, a non-Euclidean structure is a structure wherein: a) the non-Euclidean structure is formed with a non-Euclidean plane; b) the non-Euclidean structure has an axis that lies on a non-Euclidean plane or is otherwise formed with a curvature; or, c) a combination of both (a) and (b) above.

Not Significantly Different: As used in this disclosure, the term not significantly different compares a specified property of a first object to the corresponding property of a reference object (reference property). The specified property is considered to be not significantly different from the reference property when the absolute value of the difference between the specified property and the reference property is less than 10.0% of the reference property value. A negligible difference is considered to be not significantly different.

Nut: As used in this disclosure, a nut is a first object that is formed with a cylindrical negative space that further comprises an interior screw thread such that a second object with a matching exterior screw thread can screwed into the first object forming a threaded connection. A nut is further defined with an inner dimension.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Pedestal: As used in this disclosure, a pedestal is an intermediary load bearing structure that forms a load path between two objects or structures.

Perimeter: As used in this disclosure, a perimeter is one or more curved or straight lines that bounds an enclosed area on a plane or surface. The perimeter of a circle is commonly referred to as a circumference.

Plant: As used in this disclosure, a plant is a biological organism: 1) that is not capable of movement over significant distances; and 2) that uses photosynthesis to create nutrients. A stationary biological organism that is not capable of movement over significant distances but does not use photosynthesis is referred to as a parasitic plant. In the vernacular, the term plant will often include parasitic plants. The intention of this disclosure is to include parasitic plants in the definition of plant. As used in this disclosure, the term foliage refers to the leaves and branches of a plant. The structure of the plant where photosynthesis occurs is called the leaf. The trunk of a plant refers to the portion of a plant that forms the biological connections between the roots of the plant and the foliage of the plant. The roots of the plant refer to the biological subsystem of the plant that draws nutrients into the plant through the soil.

Platform: As used in this disclosure, a platform is an elevated horizontal surface that forms a load path to support objects placed on the superior surface of the platform.

Primary Shape: As used in this disclosure, the primary shape refers to a description of the rough overall geometric shape of an object that is assembled from multiple components or surfaces. The term essential primary shape is used to indicate the exclusion of functional items that are attached to the structure of the primary shape.

Primary Structure: As used in this disclosure, a primary structure refers to the component of an object that the other components attach to. The primary structure is also called the base structure.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Protected Space: As used in this disclosure, a protected space is a negative space within which an object is stored. The protected space is enclosed by a barrier structure that: a) prevents damage to the object contained within the protected space; b) maintains conditions that are appropriate for the object; c) protects the object within the protected space from potential dangers that are outside of the protected space; or, d) maintains the privacy of the object within the protected space.

Radial: As used in this disclosure, the term radial refers to a direction that: 1) is perpendicular to an identified central axis; or, 2) projects away from a center point.

Rigid Structure: As used in this disclosure, a rigid structure is a solid structure formed from an inelastic material that resists changes in shape. A rigid structure will permanently deform as it fails under a force. See bimodal flexible structure.

Roughly: As used in this disclosure, roughly refers to a comparison between two objects. Roughly means that the difference between one or more parameters of the two compared objects are not significantly different.

Screw: As used in this disclosure, to screw is a verb meaning: 1) to fasten or unfasten (unscrew) a threaded connection; or 2) to attach a helical structure to a solid structure.

Screw: As used in this disclosure, a screw is a cylindrical, or tapered cylindrical, structure that is formed with an exterior screw thread. A screw is used to attach a first object to a second object.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Threaded Connection: As used in this disclosure, a threaded connection is a type of fastener that is used to join a first cylindrical object and a second cylindrical object together. The first cylindrical object is fitted with a first fitting selected from an interior screw thread or an exterior screw thread. The second cylindrical object is fitted with the remaining screw thread. The cylindrical object fitted with the exterior screw thread is placed into the remaining cylindrical object such that: 1) the interior screw thread and the exterior screw thread interconnect; and, 2) when the cylindrical object fitted with the exterior screw thread is rotated the rotational motion is converted into linear motion that moves the cylindrical object fitted with the exterior screw thread either into or out of the remaining cylindrical object. The direction of linear motion is determined by the direction of rotation. A note on usage: when fastening two objects the exterior screw thread of the threaded connection can be formed on a first object and the matching interior screw thread of the threaded connection can be formed in a second object without significant regard as to which object of the two objects is the first object and which of the two objects is the second object. When the assignment of the type of screw thread does not provide a significant technical advantage, the screw thread assigned to the first object will simply be referred to as the "exterior/interior screw thread" with the understanding that when the two objects are fastened together one of the two objects will have an exterior screw thread and the remaining object will have an interior screw thread.

Tree: As used in this disclosure, a tree is a plant. The typical tree projects a roughly prism shaped structure out of the ground in a roughly vertically oriented direction with a single structure called a trunk. Once above the ground, the tree grows a plurality of branches. Each branches is a roughly prism shaped structure that is roughly horizontally oriented. Leaves grow on the branches of the tree.

Tube: As used in this disclosure, the term tube is used to describe a hollow prism-shaped device with two congruent open ends. While tubes that are suitable for use in this disclosure are often used to transport or conveys fluids or gases, the purpose of the tubes in this disclosure are structural. In this disclosure, the terms inner dimension and outer dimension of a tube are used as they would be used by those skilled in the plumbing arts.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

With respect to the above description, it is to be realized that the optimum dimensional relationship for the various components of the invention described above and in FIGS. 1 through 9 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A mounted bracket for use in building on a tree comprising
    a platform plate, a mounting nut, a guard plate, and a fastening device;
    wherein the mounting nut and the guard plate attach to the platform plate;
    wherein the fastening device secures the mounted bracket to a load bearing structure;
    wherein one or more instantiations of the mounted bracket for use in building on a tree attaches a platform structure to the load bearing anchor structure;
    wherein the one or more instantiations of the mounted bracket for use in building on a tree elevate the platform structure above the ground;
    wherein the mounting nut transfers a portion of the load borne by the platform plate directly to the load bearing anchor structure;
    wherein the mounting nut transfers the balance of the load borne by the platform plate to the fastening device;
    wherein the fastening device inserts through the mounting nut to secure the mounted bracket for use in building on a tree to the load bearing anchor structure;
    wherein the guard plate attaches to an inferior plate face of the platform plate;
    wherein the guard plate forms a protected space that encloses the mounting nut;
    wherein the guard plate protects the mounting nut from potential environmental impacts;
    wherein the guard plate is a roughly u-shaped structure.

2. The mounted bracket for use in building on a tree according to claim 1
    wherein the mounted bracket for use in building on a tree is a mechanical structure;
    wherein each mounted bracket for use in building on a tree is a bracket.

3. The mounted bracket for use in building on a tree according to claim 2
    wherein the load bearing anchor structure is a load bearing structure;
    wherein the load bearing anchor structure forms the structure that transfers the load of the mounted bracket for use in building on a tree to the ground.

4. The mounted bracket for use in building on a tree according to claim 3
    wherein the platform structure is a disk shaped structure;
    wherein the platform structure is a Euclidean structure;
    wherein the platform structure is a horizontally oriented structure;
    wherein the platform structure attaches to the platform plate;
    wherein the platform plate elevates the platform structure above the ground;
    wherein the platform structure comprises an inferior platform face and a superior platform face;
    wherein the superior platform face is the congruent end of the disk structure of the platform structure with the greatest surface area;
    wherein the superior platform face is the congruent end of platform structure that is distal from the ground;
    wherein the inferior platform face is the congruent end of the disk structure of the platform structure that is distal from the superior platform face;
    wherein the inferior platform face is the congruent end of platform structure that is proximal to the ground.

5. The mounted bracket for use in building on a tree according to claim 4
    wherein the platform plate is a Euclidean structure;
    wherein the platform plate is a rigid structure;
    wherein the platform plate is a load bearing structure;
    wherein the platform plate forms the structure that attaches the mounted bracket for use in building on a tree to the inferior platform face of the platform structure;
    wherein the platform plate receives the load of the platform structure;
    wherein the platform plate transfers the load of the platform structure to the mounting nut.

6. The mounted bracket for use in building on a tree according to claim 5
    wherein the mounting nut is a hollow structure;
    wherein the mounting nut has a tubular shape;
    wherein the lateral face of the mounting nut permanently attaches to the inferior plate face of the platform plate;
    wherein the mounting nut receives the load of the platform plate.

7. The mounted bracket for use in building on a tree according to claim 6
    wherein the fastening device is a mechanical structure;
    wherein the fastening device forms the physical device that attaches the mounted bracket for use in building on a tree to the load bearing anchor structure;
    wherein the fastening device is configured for use with one instantiation of the mounted bracket for use in building on a tree;

wherein the fastening device is configurable for simultaneous use with two instantiations of the mounted bracket for use in building on a tree.

8. The mounted bracket for use in building on a tree according to claim 7
   wherein the platform plate comprises a first mounting nut, a second mounting nut, an inferior plate face, and a superior plate face;
   wherein the first mounting nut is a clean nut;
   wherein the first mounting nut forms a negative space that passes through the inferior plate face and the superior plate face of the platform plate;
   wherein the first mounting nut forms a nut that allows a screw to screw directly into the inferior platform face of the platform structure;
   wherein the second mounting nut is a clean nut;
   wherein the second mounting nut forms a negative space that passes through the inferior plate face and the superior plate face of the platform plate;
   wherein the second mounting nut forms a nut that allows a screw to screw directly into the inferior platform face of the platform structure;
   wherein the superior plate face is the congruent end of the disk structure of the platform plate with the greatest surface area;
   wherein the superior plate face is the face of the platform plate that is placed against the inferior platform face of the fastening device;
   wherein the inferior plate face is the congruent end of the disk structure of the platform plate that is distal from the superior plate face;
   wherein the inferior plate face is the face of the platform plate that is distal from the inferior platform face;
   wherein the mounting nut attaches to the inferior plate face;
   wherein the guard plate attaches to the inferior plate face.

9. The mounted bracket for use in building on a tree according to claim 8
   wherein the mounting nut comprises a first open end and a second open end;
   wherein the first open end is an open congruent end of the tubular structure of the mounting nut;
   wherein the first open end is the congruent end of the mounting nut that is distal from the load bearing anchor structure;
   wherein the fastening device inserts into the mounting nut through the first open end;
   wherein the second open end is an open congruent end of the tubular structure of the mounting nut;
   wherein the second open end is the congruent end of the mounting nut that is proximal to the load bearing anchor structure;
   wherein the fastening device exits the second open end as the fastening device attaches to the load bearing anchor structure.

10. The mounted bracket for use in building on a tree according to claim 9
    wherein the guard plate comprises a convex face and a concave face;
    wherein the concave face is a concave surface that is formed in the u-shape of the guard plate;
    wherein the concave face forms the interior surface of the boundary of the protected space formed by the guard plate;
    wherein the concave face forms the surface of the guard plate that is proximal to the mounting nut;
    wherein the convex face is a concave surface that is formed in the u-shape of the guard plate;
    wherein the convex face forms the exterior surface of the boundary of the of the protected space formed by the guard plate;
    wherein the convex face forms the surface of the guard plate that is distal from the mounting nut.

11. The mounted bracket for use in building on a tree according to claim 10
    wherein the fastening device is selected from the group consisting of anchor screw and a mounting bolt;
    wherein the anchor screw is a helical structure;
    wherein the mounting bolt is a helical structure.

12. The mounted bracket for use in building on a tree according to claim 11
    wherein the anchor screw is a wood screw;
    wherein the anchor screw is a screw structure that forms a point at the working end of the screw;
    wherein the anchor screw is formed with an external screw;
    wherein the anchor screw inserts through the mounting nut;
    wherein the anchor screw fastens the mounted bracket for use in building on a tree to the load bearing anchor structure by screwing into the load bearing anchor structure;
    wherein the mounting bolt is formed with an exterior screw.

13. The mounted bracket for use in building on a tree according to claim 11
    wherein the mounting bolt inserts through a first mounting nut of a first instantiation of the mounted bracket for use in building on a tree;
    wherein the mounting bolt further inserts through a second mounting nut of a second instantiation of the mounted bracket for use in building on a tree;
    wherein the mounting bolt a threaded nut attaches to the two congruent ends of the mounting bolt to secure the platform structure to the load bearing anchor structure.

* * * * *